United States Patent [19]
Dunlap

[11] Patent Number: 5,540,472
[45] Date of Patent: Jul. 30, 1996

[54] REINFORCING SLEEVE FOR LONG-HANDLED TOOLS

[75] Inventor: Mark O. Dunlap, Makawao, Hi.

[73] Assignee: Rainbow Equipment Company, Portland, Oreg.

[21] Appl. No.: 303,075

[22] Filed: Sep. 8, 1994

[51] Int. Cl.⁶ .................... A01B 1/22; B25G 3/34
[52] U.S. Cl. ........................................................ 294/57
[58] Field of Search ................ 294/49, 50.6, 53.5, 294/54.5, 55.5, 57–59; 15/143.1; 16/110 R, 111 R, 114 R, 116 R, DIG. 18; 29/242; 76/113; 81/177.1, 489, 492; 172/371; 403/11, 293, 298, 341, 286

[56] References Cited

U.S. PATENT DOCUMENTS

| | | | |
|---|---|---|---|
| 297,132 | 4/1884 | Hudson | 294/57 |
| 327,522 | 10/1885 | Cadwell | 294/57 |
| 557,380 | 3/1896 | Gordon | 294/49 |
| 641,401 | 1/1900 | Nicolay | 294/57 |
| 645,988 | 3/1900 | Willard | 294/57 X |
| 812,309 | 2/1906 | Swagerty | 403/286 X |
| 1,458,987 | 6/1923 | Della Monica | 294/55.5 |
| 1,755,236 | 4/1930 | Brandenburg | 294/57 |
| 2,060,707 | 11/1936 | Webster | 294/57 |
| 2,763,506 | 9/1956 | Denker et al. | 294/57 |
| 3,619,009 | 11/1971 | O'Leary | 294/57 X |
| 3,767,249 | 10/1973 | Rogers | 294/57 X |
| 4,605,254 | 8/1986 | Carmien | 294/57 |
| 4,790,586 | 12/1988 | Stoner | 294/57 |

FOREIGN PATENT DOCUMENTS

| | | | |
|---|---|---|---|
| 234243 | 12/1959 | Australia | 294/57 |
| 1007708 | 5/1952 | France | 294/57 |
| 687817 | 2/1940 | Germany | 294/57 |
| 171039 | 11/1921 | United Kingdom . | |
| 487074 | 6/1938 | United Kingdom | 294/57 |
| 1173714 | 12/1969 | United Kingdom | 294/57 |
| 2014079 | 8/1979 | United Kingdom . | |

*Primary Examiner*—Johnny D. Cherry
*Attorney, Agent, or Firm*—Klarquist, Sparkman, Campbell, Leigh & Whinston

[57] ABSTRACT

A retrofittable reinforcing tubular sleeve that is operable to reinforce a variety of long-handled implements. The sleeve is slid over the free end of the handle and toward the implement head to establish a snug fit between the wall of the sleeve bore and the neck of the implement head. A reinforcing spine extends lengthwise along the exterior of the sleeve. The sleeve is positioned on the handle such that the spine extends adjacent the aft side of the implement handle.

21 Claims, 2 Drawing Sheets

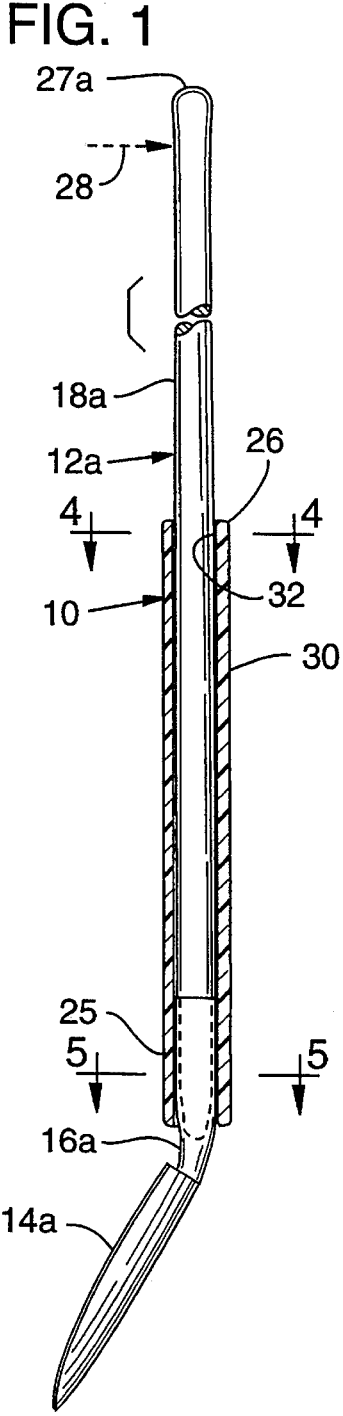
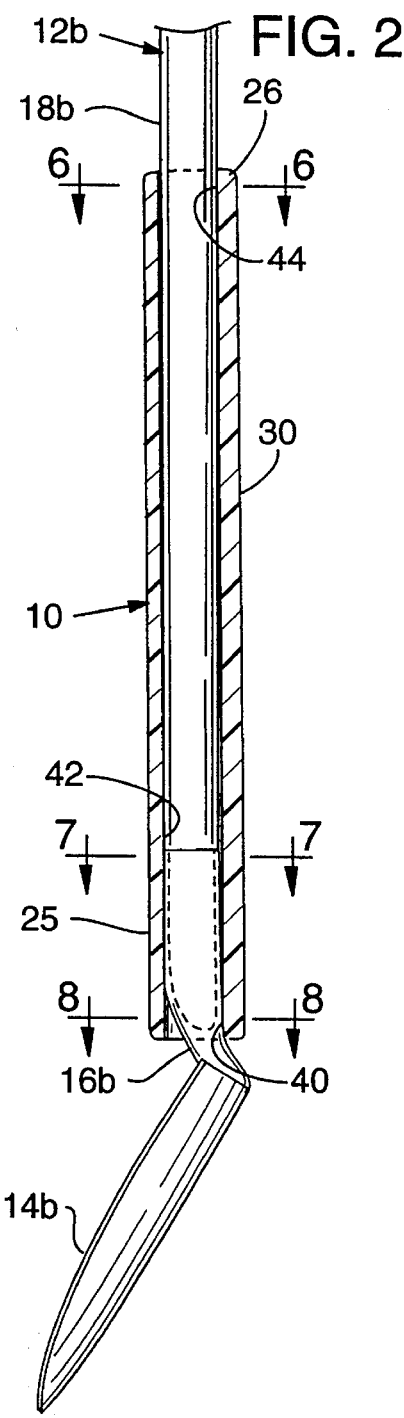
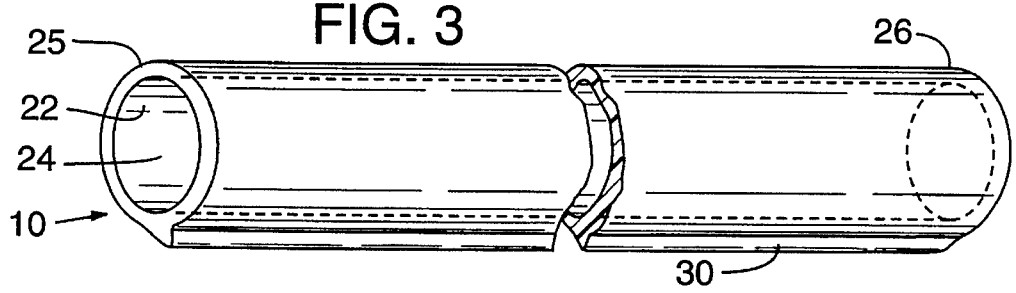

5,540,472

REINFORCING SLEEVE FOR LONG-HANDLED TOOLS

FIELD OF THE INVENTION

The present invention relates to reinforcing devices for long-handled tools, and especially to devices for reinforcing wooden tool handles where they join a metal tool.

BACKGROUND INFORMATION

Long-handled tools or implements, such as shovels, hoes, and pitchforks have been in use for many years. Such implements typically have a metal head (such as the blade of a shovel) with a tubular neck portion that receives an elongate wooden handle. While such implements generally work well, their handles can be easily overstressed at the neck where bending stress concentrations develop, causing the handles to crack, snap, or loosen at that point. Such stresses are particularly great when, for instance, the free end of a tool handle is forced in a fore or aft direction while the implement head is embedded in hard earth or similar material. To overcome the foregoing problems, tool handles have been made out of stronger materials than wood, such as fiberglass or metal. But such handles are expensive and difficult to retrofit on existing tools.

To strengthen existing wood tool handles, reinforcing devices such as metal straps and rods have been attached to the handles. Such devices typically extend along substantially the entire length of the handle, and are fastened to the handle by screws, rivets, staples, or the like, which can weaken the handle. Such strap or rod reinforcing devices tend to be heavy and expensive, and may catch the hands or gloves of a user when the handle is gripped.

SUMMARY OF THE INVENTION

The primary object of the present invention is to provide a reinforcing device for reinforcing a wooden tool handle where it joins a metal tool that avoids the foregoing problems.

Another object of the present invention is to provide a reinforcing device as aforesaid that reinforces the handle without weakening it.

A further object is to provide a reinforcing device as aforesaid that can be retrofitted on existing tools.

Other objects are to provide a device as aforesaid that is simple to make and apply, strong, lightweight, inexpensive and unobtrusive.

According to the invention, I have discovered that an effective reinforcing device need only reinforce the handle in the region of its maximum bending stress, where it joins the metal tool head, in order to perform well.

In accordance with my discovery, the invention comprises a retrofittable tubular reinforcing sleeve. The sleeve is rigid and has an internal diameter sized such that the sleeve is slidable over the free end of the handle, along the handle and over the metal neck of the tool head. When in place, the sleeve overlaps the neck and handle where they join. The sleeve extends only part-way up the handle and may be made of a strong, lightweight material, such as fiberglass.

The sleeve may be securely mounted on the implement by sizing the sleeve to establish a snug contact or jam fit between the sleeve and the implement neck. Such fit eliminates the need for screw fasteners and the like, and also permits the convenient retrofitting of the sleeve onto existing tools.

The sleeve also may be a relatively thin tubular section by providing it with a reinforcing spine that extends lengthwise along the sleeve's exterior. By positioning the sleeve on the handle with the spine along the aft side of the handle, maximum resistance to bending at the neck is provided.

The foregoing and other objects, features and advantages of the invention will become more apparent from the detailed description with reference to the following drawings.

BRIEF DESCRIPTION OF THE DRAWINGS

FIG. 1 is a somewhat foreshortened side view of a shovel showing the reinforcing sleeve of the invention in axial-section installed thereon.

FIG. 2 is an enlarged view of the lower portion of a different shovel, showing the reinforcing sleeve of the invention in axial-section installed thereon.

FIG. 3 is an enlarged but foreshortened perspective view of the reinforcing sleeve of the invention before installation.

DETAILED DESCRIPTION OF PREFERRED EMBODIMENTS

Figure 4:
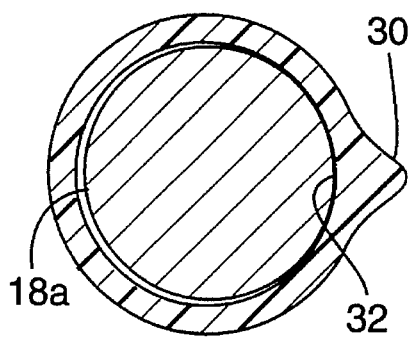
FIG. 4 is a sectional view taken along line 4—4 of FIG. 1.

A rigid, tubular reinforcing sleeve 10 in accordance with a preferred embodiment of the invention is shown in perspective in FIG. 3. The sleeve is designed to be mounted upon a variety of long-handled tools, such as the shovels 12a, 12b shown in FIGS. 1 and 2. The shovels have conventional heads 14a, 14b terminating in annular necks 16a, 16b that receive respective elongate handles 18a, 18b. As will be described, the sleeve 10 is mounted upon the shovels to provide reinforcement at and adjacent the joint of the shovel necks 16a, 16b to the shovel handles 18a, 18b.

Figure 5:
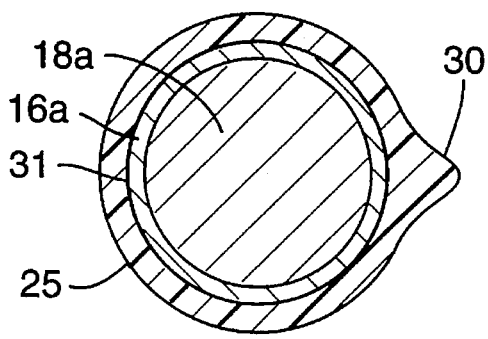
FIG. 5 is a sectional view taken along line 5—5 of FIG. 1.

As shown in FIG. 3, the tubular sleeve 10 has a cylindrical internal wall 22 defining an axial bore 24 of uniform diameter from end-to-end of the sleeve. The bore cross-section has a shape complementary to the cross-section of the handle, which is in this case circular. The sleeve has first and second ends 25, 26, and a thickened reinforcing spine or rib portion 30 that extends longitudinally along the exterior from end-to-end of the sleeve. As best shown in FIGS. 4 and 5, the spine has a protruding, generally triangular cross-section.

As an example of a size of sleeve that has been found in tests to work well with typical long-handled shovels, the sleeve bore diameter is around one and nine-sixteenth inches, and the sleeve wall thickness is about three-sixteenth inch. The triangular cross-section of the reinforcing spine has a height of about one-half inch, measured from the internal wall 22 to the top of the spine. The overall sleeve length is about twenty inches. The sleeve 10 is preferably made of molded fiberglass.

Describing the sleeve relative to shovel 12a shown in FIG. 1, the sleeve bore 24 is sized slightly diametrically larger than the diameter of the handle 18a, so that the sleeve may be slid over the free end 27a of the handle and freely along the handle toward the shovel head 14a. The shovel neck 16a has an internal bore diameter sized to tightly receive the slightly tapered lower end of the handle 18a when the handle is driven into the bore. Similarly, the sleeve bore is preferably sized to grip snugly over the shovel neck and handled where they join. In this way, a substantially continuous, tight, annular contact fit 31 is established between the internal bore wall 22 and the shovel neck 16a (see FIG. 5). The installed sleeve also extends from the neck 16a up the handle 18a a substantial distance and closely surrounds the handle. The sleeve is preferably positioned such that the spine 30 extends adjacent the aft side of the handle where compressive stresses induced by bending are greatest.

The installed sleeve 10 reinforces the handle by restraining it from excessive bending, especially relative to the neck of the shovel blade. The sleeve effectively provides a splint for the handle where it joins the blade. Bending stresses in the handle at the joint are transferred to the sleeve, whose large diameter and tubular construction makes it better adapted to resist bending than the handle itself. As a result, breakage of the handle through overstress is prevented. For example, when head 14a is embedded in hard-packed earth and the handle's free end 27a is forced in direction 28, the handle bends only until an aft portion of the handle 18a contacts an aft portion 32 of the bore wall 22 adjacent the second sleeve end 26. At that point, additional bending stresses are taken up by the sleeve. Such limiting of handle bending accordingly limits the handle bending stresses concentrating adjacent the shovel neck 16a, thereby preventing handle breakage. It will be apparent that the sleeve limits bending of the handle in a similar manner when a heavy load of material is lifted by the shovel blade 14a.

The sleeve similarly accommodates a shovel with a handle that is diametrically larger than the shovel neck. In such a case, a contact or grip fit is established between the internal bore wall and the handle, with the bore wall limiting the bending of the neck relative to the handle. Such limiting of neck bending accordingly limits the handle bending stresses concentrating adjacent the shovel neck.

The spine 30 provides reinforcement for the sleeve, where it is needed most. For instance, when positioned on the aft side of handle 18a (i.e., on the side of the handle aligned with the back of the shovel blade), the spine compressively bears much of the handle loading, permitting the rest of the sleeve to be a relatively thin, tubular section light in weight and of unobtrusive size.

Figure 8:
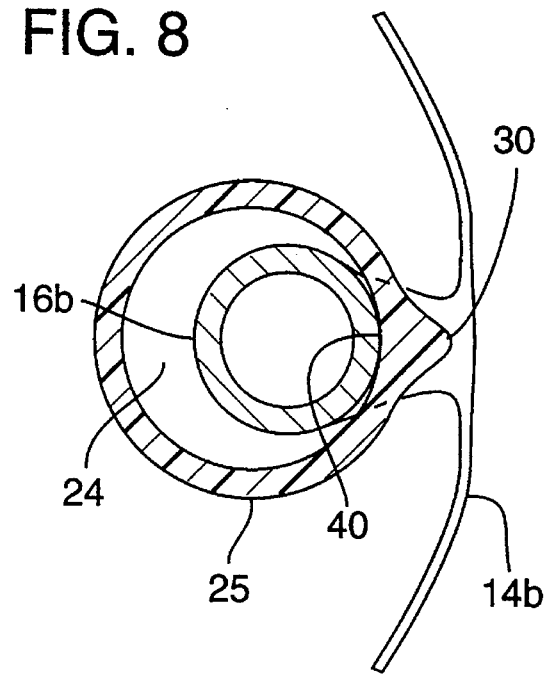
FIG. 8 is a sectional view taken along line 8—8 of FIG. 2.

FIG. 2 illustrates the snug grip fitting of the sleeve on another shovel 12b. In this example, the shovel neck 16b is diametrically slightly smaller than the diameter of the bore 24. Such may be the case in shovels having neck diameters equal to or smaller than handle diameters. To fit the sleeve on such a shovel, the sleeve is slid along the handle 18b and over the shovel neck until a first contact fit 40 is established between the sleeve and a curved portion of the neck (see FIGS. 2 and 8).

Figure 6:
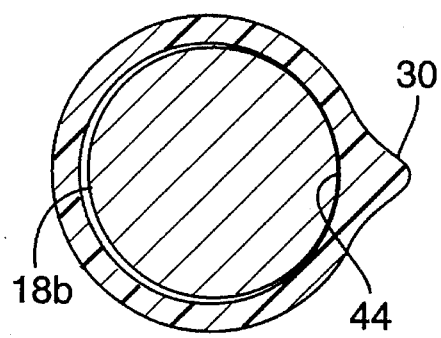
FIG. 6 is a sectional view taken along line 6—6 of FIG. 2.
Figure 7:
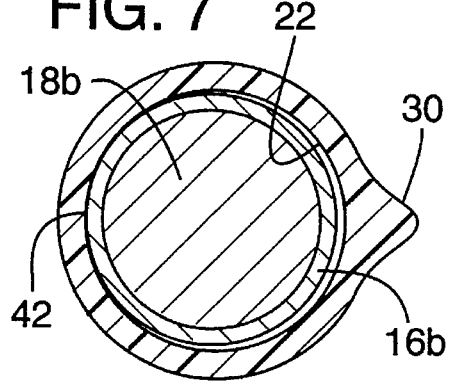
FIG. 7 is a sectional view taken along line 7—7 of FIG. 2.

The first contact 40 is established between a first bore wall portion adjacent the first end 25 of the sleeve and a neck portion on the aft side of the curved neck 16b adjacent the shovel head. As shown in FIGS. 2 and 7, an intermediate contact 42 is formed between an intermediate bore wall portion circumferentially opposite the first bore wall portion, and a portion of either the neck 16b or the handle 20b circumferentially opposite the first neck portion. As shown in FIGS. 2 and 6, a second contact 44 is established between a second bore wall portion adjacent the second end 26 of the sleeve and a second portion of the handle. The second bore wall portion is circumferentially aligned with the first bore wall portion.

It is contemplated that similar contact fits are formable with variations in neck curvature. For instance, when the shovel neck curves forward from the handle to the shovel head, first, intermediate, and second contacts are established that are circumferentially opposite those described above.

While it is contemplated to offer sleeves with various bore sizes to accommodate relatively thick- and thin-handled tools, the variety of fits discussed above shows that a single bore size will accommodate a range of tool handle and neck sizes.

It is to be understood that the above-described sleeve is exemplary only, and that features such as dimensions, materials, and spine and bore configurations may be varied without departing from the invention. For instance, the sleeve length and bore dimensions may be varied to accommodate a range of tools. Other sleeve materials such as high-strength plastics, composites, or light-weight metals may be used. The spine profile may be varied, or the outer profile of the sleeve may be ovalized to yield thickened "spine" areas fore and aft of the bore. Furthermore, the spine need only extend along a portion of the length of the sleeve to provide excellent reinforcement. The spine may also be effectively positioned at the forward side of the handle. The bore profile may also be varied to conform to a noncircular, cross-sectional shape of a tool handle and neck. The bore may also be "stepped" at one end to provide a larger diameter bore section to accommodate a tool neck that is substantially thicker than the tool handle. Furthermore, the illustrated shovels 12a, 12b are exemplary only. The sleeve 10 may be applied equally as well to other types of shovels, as well as to other tools, such as hoes and pitchforks, where a handle is received within a tubular neck of the tool.

This detailed description sets forth a currently preferred embodiment of the present invention and should not be considered to limit the scope of the invention in any way. Numerous additions, substitutions, and modifications can be made to these examples without departing from the true spirit and scope of the invention as defined by the appended claims and their equivalents.

What is claimed is:

1. A retrofittable device for reinforcing the joint between a metal head and wooden handle of a long-handled tool in which the head includes a tubular neck that receives the handle at the joint, the handle having a length, the device comprising:

a rigid sleeve defining a smooth internal bore extending throughout the sleeve, the bore sized such that the sleeve is slidable over and along the handle to the neck of the tool to which it is to be applied, and to fit tightly on the neck, the sleeve having first and second ends and a length sufficient to overlap the handle and the neck for a substantial distance beyond the joint to limit bending of the handle relative to the neck, the sleeve having a length that is substantially less than the length of the tool handle.

2. The device according to claim 1, wherein the bore has a constant diameter longitudinally throughout the sleeve.

3. The device according to claim 1, wherein the bore adjacent the first end of the sleeve is sized to establish an annular contact fit with the neck.

4. The device according to claim 1, wherein the bore adjacent the second end of the sleeve is sized to closely surround the handle.

5. The device according to claim 1, wherein the bore is sized such that an inwardly-facing internal wall of the sleeve defining the bore can be jammed into engagement with the neck at a position wherein the sleeve extends along both the neck and handle for a substantial distance beyond the joint.

6. The device according to claim 1, wherein the sleeve has a selected length that is less than about one-half the length of the handle to which the sleeve is applied.

7. The device according to claim 1, wherein the sleeve has a relatively thick reinforcing portion that extends longitudinally of the exterior of the sleeve to resist bending of the handle.

8. The device according to claim 1, wherein the sleeve is a fiberglass tube.

9. The device of claim 1 wherein the sleeve has an external axial spine extending between its opposite ends.

10. A long-handled tool comprising:

a metal tool head with a tubular neck that receives an elongate handle at a joint, the handle having a free end opposite the joint;

a retrofittable rigid sleeve with a smooth internal bore extending throughout the sleeve, the sleeve overlapping and closely surrounding the neck and handle for a substantial distance on opposite sides of the joint and in gripping relationship with at least one of the neck and handle, the sleeve extending in close-fitting relationship to the handle for a substantial distance beyond the joint to resist bending of the handle relative to the neck, the handle free end being spaced a substantial distance from the sleeve.

11. The tool according to claim 10, wherein the sleeve grips the neck.

12. The tool according to claim 10, wherein the sleeve grips the handle.

13. The tool according to claim 10, wherein the bore has a bore diameter, the neck has a neck diameter and the handle has a handle diameter, the bore diameter being larger than the neck diameter and the handle diameter, and the neck has a curved portion and a first end portion of the sleeve contacts the neck adjacent the curved portion, an intermediate portion of the sleeve contacts the neck adjacent the joint, and a second end portion of the sleeve is spaced a substantial distance from the joint on the handle, the first end portion and intermediate portion of the sleeve in contact with the neck are circumferentially opposed to one another, such that the sleeve is jammed into a tight-fitting relationship with the neck.

14. The tool according to claim 10, wherein the sleeve is a fiberglass tube.

15. The tool according to claim 10, wherein the sleeve has an external spine extending axially thereof, the spine being positioned on the aft side of the handle and neck.

16. A method of reinforcing a long-handled tool such as a shovel, the tool having a tool head with a tubular neck mounted over an elongate handle at a joint, the elongate handle terminating at a free end opposite the joint, the method comprising the steps of:

providing a rigid tubular sleeve having first and second ends and a length substantially less than the length of the tool handle, and having an interior wall defining an axial bore;

sliding the tubular sleeve over a free end of the handle and longitudinally along the handle toward the tool head; and continuing the sliding movement of the sleeve toward the tool head to jam the sleeve into tight engagement with the neck and thereby establish a snug fit between the interior wall of the sleeve and the tool neck to resist the bending of the handle at the joint, the jammed sleeve being removable from the tool be forcing the sleeve away from the neck and toward the free end of the handle.

17. The method of claim 16, wherein the step of establishing the snug fit further includes the step of forming a snug annular contact between a first portion of the sleeve interior wall adjacent the first end of the sleeve and the tool neck.

18. The method of claim 16, further comprising the step of forming a second contact between a portion of the handle spaced apart from the joint and a second portion of the sleeve interior wall adjacent the second end of the sleeve to limit the bending of the handle when the tool is loaded.

19. The method of claim 16, further comprising the steps of:

forming a first snug contact between a first portion of the bore wall adjacent a first end of the sleeve and a portion of the tool neck;

forming an intermediate snug contact between an intermediate portion of the bore wall and the tool adjacent the joint; and forming a second snug contact between a second portion of the bore wall adjacent the second end of the sleeve and a portion of the handle.

20. The method of claim 18, further comprising the steps of:

providing a relatively thick reinforcing portion on the exterior of the sleeve;

positioning the reinforcing portion adjacent the aft side of the handle;

loading the reinforcing portion predominantly in compression, and loading the portion of the tool handle within the sleeve predominantly in tension, when the tool is loaded.

21. The device according to claim 1, wherein the sleeve is made of non-metallic material.

\* \* \* \* \*